United States Patent
Qiao

(10) Patent No.: US 12,179,879 B2
(45) Date of Patent: Dec. 31, 2024

(54) SCOOTER

(71) Applicant: INTRADIN (SHANGHAI) MACHINERY CO., LTD., Shanghai (CN)

(72) Inventor: Xuetao Qiao, Shanghai (CN)

(73) Assignee: INTRADIN (SHANGHAI) MACHINERY CO., LTD., Shanghai (CN)

( * ) Notice: Subject to any disclaimer, the term of this patent is extended or adjusted under 35 U.S.C. 154(b) by 0 days.

(21) Appl. No.: 17/506,924

(22) Filed: Oct. 21, 2021

(65) Prior Publication Data
US 2022/0041243 A1 Feb. 10, 2022

(30) Foreign Application Priority Data
Sep. 8, 2021 (CN) .......................... 202111049897.3

(51) Int. Cl.
*B62K 5/025* (2013.01)
*B62K 19/30* (2006.01)

(52) U.S. Cl.
CPC .............. *B62K 5/025* (2013.01); *B62K 19/30* (2013.01); *B62K 2202/00* (2013.01)

(58) Field of Classification Search
CPC .......... B62K 5/025; B62K 5/027; B62K 5/10; B62K 5/06; B62K 2202/00; B62K 19/30; B62K 2204/00; B62D 61/08; B62M 7/08; B62M 7/12
USPC ....................................................... 180/210
See application file for complete search history.

(56) References Cited

U.S. PATENT DOCUMENTS

| | | | | |
|---|---|---|---|---|
| 4,029,991 A * | 6/1977 | Schultz | ................ | H05B 45/395 315/297 |
| 4,316,520 A * | 2/1982 | Yamamoto | ............. | B62D 61/08 180/215 |
| 5,277,267 A * | 1/1994 | Tiffany | .................. | B62K 5/027 280/278 |
| 6,378,642 B1 * | 4/2002 | Sutton | ..................... | B62M 6/65 180/208 |

(Continued)

FOREIGN PATENT DOCUMENTS

CN 200942835 Y * 9/2007
CN 202089204 U 12/2011

(Continued)

OTHER PUBLICATIONS

CN 206141721 U, Cai J, Original Doc. and English Translation (Year: 2017).*

(Continued)

*Primary Examiner* — Paul N Dickson
*Assistant Examiner* — Caitlin Anne Miller

(57) ABSTRACT

A scooter, including a main body, a front wheel, a first rear wheel, a second rear wheel, a drive part and a controller. The front wheel is rotatably arranged at a front part of the main body. The first rear wheel and the second rear wheel are spaced apart and rotatably arranged at a rear part of the main body. One drive part is provided, which is connected to the first rear wheel, and is configured to merely drive the first rear wheel to rotate, so as to driving the main body to move. The controller is electrically connected to the drive part to adjust a rotation speed of the drive part, so as to adjust a rotation speed of the first rear wheel.

10 Claims, 4 Drawing Sheets

(56) References Cited

U.S. PATENT DOCUMENTS

| | | | | |
|---|---|---|---|---|
| 6,384,351 | B1* | 5/2002 | Schwartz | B60Q 1/1461 |
| | | | | 200/61.54 |
| 9,193,240 | B2* | 11/2015 | Lin | A61G 5/045 |
| 10,549,809 | B2* | 2/2020 | Kuo | B62K 21/16 |
| 10,745,075 | B2* | 8/2020 | Kama | B62K 15/006 |
| 2002/0139648 | A1* | 10/2002 | Hoskins | B60Q 1/1476 |
| | | | | 200/61.54 |
| 2011/0247889 | A1* | 10/2011 | Kosco | B62K 15/006 |
| | | | | 180/208 |
| 2018/0065700 | A1* | 3/2018 | Kama | B62K 5/027 |
| 2019/0225294 | A1* | 7/2019 | Schneider | B62J 43/16 |
| 2020/0008990 | A1* | 1/2020 | Harrison | B62K 5/025 |
| 2020/0317287 | A1* | 10/2020 | Kong | B62H 1/02 |
| 2021/0331764 | A1* | 10/2021 | Wang | B62J 1/08 |

FOREIGN PATENT DOCUMENTS

| | | | | | |
|---|---|---|---|---|---|
| CN | 104118505 | B | * | 3/2016 | |
| CN | 206141721 | U | * | 5/2017 | |
| CN | 208731174 | U | * | 4/2019 | |
| CN | 209159885 | U | * | 7/2019 | |
| CN | 213270939 | U | | 5/2021 | |
| CN | 113147972 | A | * | 7/2021 | |
| DE | 202021100148 | U1 | * | 3/2021 | |
| FR | 2733187 | A1 | * | 10/1996 | A63B 55/61 |
| KR | 20090011668 | U | * | 11/2001 | |
| KR | 200314799 | Y1 | * | 5/2003 | |
| WO | WO-2011123094 | A1 | * | 10/2011 | B60N 2/502 |

OTHER PUBLICATIONS

CN 209159885 U, Xing, Original Document and English Translation (Year: 2019).*

CN 113147972 A, Liang, Original Document and English Translation (Year: 2020).*

Drive Medical Design & Manufacturing Cobra GT4 Owner's manual, published May 23, 2017, retrieved Jan. 3, 2024 (Year: 2017).*

* cited by examiner

SCOOTER

CROSS-REFERENCE TO RELATED APPLICATIONS

This application claims the benefit of priority from Chinese Patent Application No. 202111049897.3, filed on Sep. 8, 2021. The content of the aforementioned applications, including any intervening amendments thereto, is incorporated herein by reference in its entirety.

TECHNICAL FIELD

This application relates to assisted walking tools, and more particularity to a scooter.

BACKGROUND

The existing scooters usually adopt a dual-rear-wheel drive or single-front-wheel drive. When a scooter with dual-rear-wheel drive turns, a turning radius of an outer rear wheel is larger than that of an inner rear wheel, so that it is often required to adjust a speed difference between the inner and outer rear wheels of the dual-rear-wheel drive scooter with the help of a differential to allow a speed of the outer wheel to be higher than that of the inner wheel, enabling the inner and outer rear wheels to turn smoothly without interfering with each other. However, the exiting differentials have complex structure and high cost, which will inevitably increase the structural complexity and cost of the dual-rear-wheel drive scooter. The existing single-front-wheel-drive scooters are prone to head-lifting, leading to a relatively low safety. Therefore, the existing dual-rear-wheel-drive scooter or single-front-wheel-drive scooter both fail to satisfy the actual requirements.

SUMMARY

Accordingly, an object of the present disclosure is to provide a scooter with simple structure, low cost and high safety.

Technical solutions of the disclosure are described as follows.

A scooter, comprising:
a main body;
a front wheel;
a first rear wheel;
a second rear wheel;
a drive part; and
a controller;
wherein the front wheel is rotatably arranged at a front part of the main body; the first rear wheel and the second rear wheel are spaced apart and both rotatably arranged at a rear part of the main body; the drive part is connected to the first rear wheel; the number of the drive part is one; the drive part is configured to rotate around its own axial to drive the first rear wheel to rotate so as to drive the main body to move to further drive the front wheel and the second rear wheel to rotate; the second rear wheel is configured to be unable to be driven by the drive part to rotate with respect to the main body; and the controller is electrically connected to the drive part, and is configured to adjust a rotation speed of the drive part, so as to adjust a rotation speed of the first rear wheel.

In some embodiments, the controller is also configured to adjust steering of the drive part, so as to adjust steering of the first rear wheel.

In some embodiments, the main body comprises a frame assembly and a seat assembly; the seat assembly is arranged on the frame assembly; the front wheel is rotatably arranged at a front part of the frame assembly; and the first rear wheel and the second rear wheel are spaced apart and rotatably arranged at a rear part of the frame assembly.

In some embodiments, the frame assembly comprises a first frame and a second frame; the first frame is rotatably connected to the second frame; the first frame is configured to rotate with respect to the second frame to realize opening or folding between the first frame and the second frame; the front wheel is rotatably arranged at a front part of the first frame; the first rear wheel and the second rear wheel are spaced apart and rotatably arranged at a rear part of the second frame; and the seat assembly is arranged on the second frame.

In some embodiments, the main body further comprises a handle assembly; the handle assembly is rotatably arranged on the frame assembly; and the front wheel is rotatably arranged on the handle assembly.

In some embodiments, the handle assembly is detachably arranged on the frame assembly; and/or
a height of the handle assembly with respect to the frame assembly is adjustable.

In some embodiments, the seat assembly is detachably arranged on the frame assembly; and/or
a height of the seat assembly with respect to the frame assembly is adjustable.

In some embodiments, the seat assembly comprises a seat and an adjustment assembly; the seat is connected to the adjustment assembly; the adjustment assembly is arranged on the frame assembly; and the adjustment assembly is configured to adjust a height of the seat.

In some embodiments, the adjustment assembly comprises an adjustment rod and a locking part; one end of the adjustment rod is sleevedly connected to the frame assembly, and the other end of the adjustment rod is connected to the seat; the adjustment rod is configured to be extended and retracted with respect to the frame assembly along an axial direction of the adjustment rod, such that the height of the seat is adjustable along the axial direction of the adjustment rod; and the locking part is configured to lock the adjustment rod to the frame assembly.

In some embodiments, an outer side wall of the adjustment rod is provided with a plurality of adjustment holes with different heights; the frame assembly is provided with a locking hole; and the locking part is configured to successively pass through the locking hole and one of the plurality of adjustment holes to adjust a length of the adjustment rod sleevedly connected with the frame assembly and lock the adjustment rod to the frame assembly, such that the height of the seat is adjusted and kept.

Compared to the prior art, the present disclosure has the following beneficial effects.

In the scooter provided herein, the front wheel, the first rear wheel and the second rear wheel are independent of each other. In the actual operation, the drive part merely drives the first rear wheel to rotate to drive the main body to move. When the main body moves, the front wheel and the second rear wheel also rotate with the first rear wheel. A rotation speed of the drive part can be adjusted via the controller according to actual requirements, so as to adjust a rotation speed of the first rear wheel and further adjust a movement speed of the main body. Since only one drive part is provided herein, and the drive part is merely configured to drive the first rear wheel to rotate, the scooter provided herein is actually a single-rear-wheel-drive scooter, which does not require a complicated differential used in the existing dual-rear-wheel-drive scooters, and is not prone to head-lifting compared to the existing single-front-wheel-drive scooters. Therefore, the scooter of the present disclosure has a simple structure, low cost and high safety.

BRIEF DESCRIPTION OF THE DRAWINGS

Technical solutions of the present disclosure and the prior art will be described below with reference to the accompany drawings to facilitate the understanding. Obviously, the accompany drawings described below are merely some embodiments of the present disclosure, and other accompany drawings can be obtained by those skilled in the art based on the drawings provided herein without paying creative effort.

Figure 1:
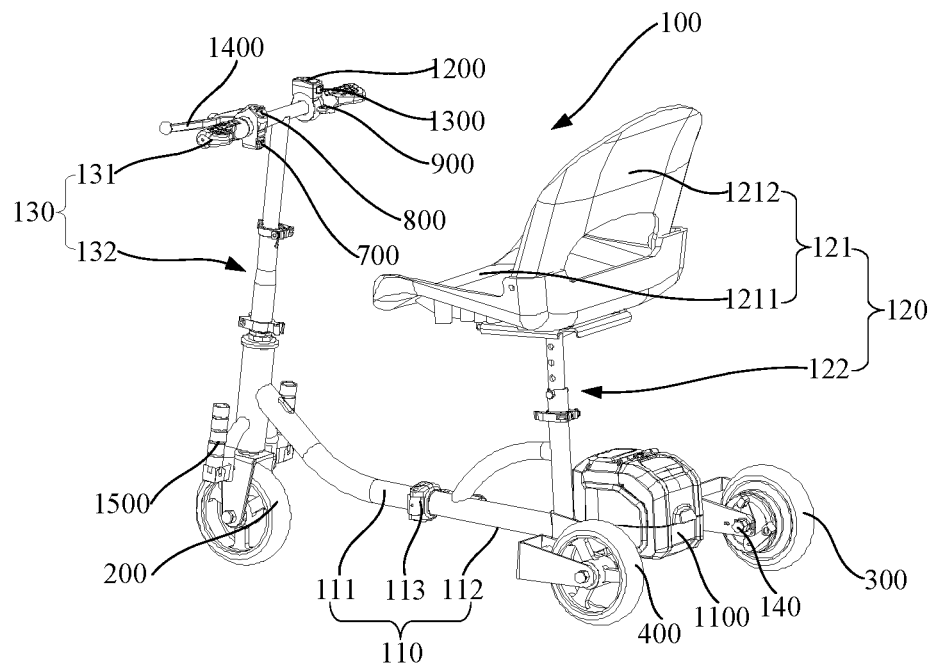
FIG. 1 schematically depicts a structure of a scooter according to an embodiment of the present disclosure.

In the drawings, 100, main body; 110, frame assembly; 111, first frame; 112, second frame; 1121, locking hole; 113, connecting part; 1131, first connecting portion; 1132; second connection portion; 1133, first locking part; 120, seat assembly; 121, seat; 1211, seat base; 1212, seat back; 122, first adjustment assembly; 1221, first adjustment rod; 12211, adjustment hole; 1222, second locking part; 1223, first anti-off part; 12231, clamping part; 122311, first clamping portion; 122312, second clamping portion; 12232, third locking part; 12233, rotating part; 130, handle assembly; 131, handle; 132, second adjustment assembly; 1321, fixing rod; 1322, third adjustment rod; 1323, fourth locking part; 1324, second anti-off part; 140, connecting shaft; 200, front wheel; 300, first rear wheel; 400, second rear wheel; 500, drive part; 600, controller; 700, first control button; 800, second control button; 900, third control button; 1000, power supply; 1100, mounting shell; 1200, indicator light; 1300, fourth control button; 1400, handbrake; and 1500, footrest portion.

The objectives, technical solutions and beneficial effects of the present disclosure will be further described below with reference to accompanying drawings and embodiments.

DETAILED DESCRIPTION OF EMBODIMENTS

Technical solutions of the present disclosure will be clearly and completely described below with reference to the embodiments and accompanying drawings. Obviously, described below are merely some embodiments of this disclosure, and are not intended to limit the disclosure. Other embodiments made by those skilled in the art based on the embodiments provided herein without paying any creative effort should fall within the scope of the present disclosure.

It should be noted that directional indications, such as up, down, left, right, front and back, used herein are merely intended to explain a relative positional relationship and movement between components in a specific posture, and if the specific posture changes, the directional indication changes accordingly. In addition, terms, such as "first" and "second", are illustrative, and should not be understood as indicating or implying a relative importance or the number of elements. Elements defined with "first" and "second" may explicitly or implicitly include at least one of the element. Besides, the "and/or" used herein includes three solutions, for example, "A and/or B" includes A, B and a combination thereof. Additionally, technical solutions of various embodiments can be combined on the premise that the combined technical solution can be implemented by those skilled in the art. When the combination of technical solutions is contradictory or cannot be implemented, it should be considered that such a combination of technical solutions does not exist, nor does it fall within the scope of the present disclosure.

The specific structure of a scooter of the present disclosure will be described below.

Figure 2:
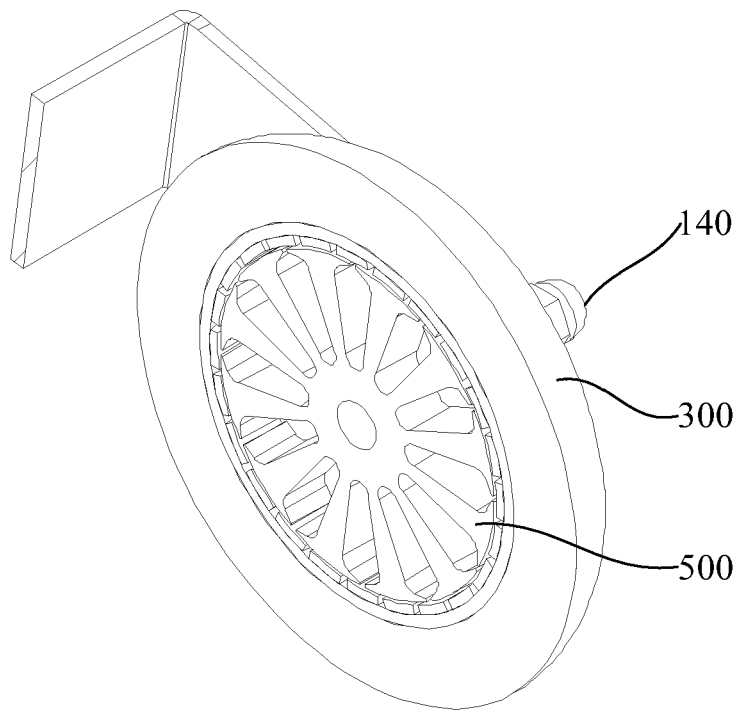
FIG. 2 is a sectional view of a first rear wheel and a drive part.
Figure 3:
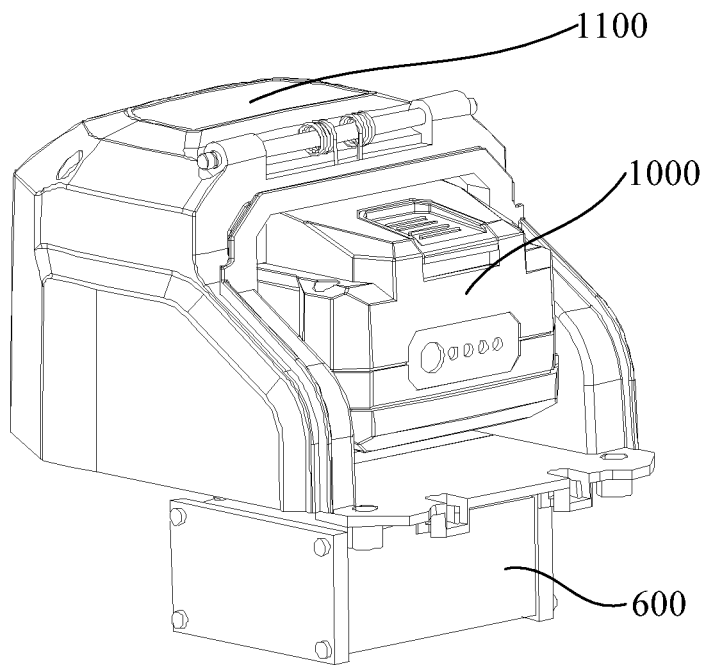
FIG. 3 schematically depicts a structure of a mounting shell.

As shown in FIGS. 1-3, a scooter of the present disclosure includes a main body 100, a front wheel 200, a first rear wheel 300, a second rear wheel 400, a drive part 500 and a controller 600. The front wheel 200 is rotatably arranged at a front part of the main body 100. The first rear wheel 300 and the second rear wheel 400 are spaced apart and rotatably arranged at a rear of the main body 100. The drive part 500 is connected to the first rear wheel 300. The number of the drive part 500 is one. The drive part 500 is configured to rotate around its own axial direction to drive the first rear wheel 300 to rotate, such that the front wheel 200 and the second rear wheel 400 are driven to rotate via the main body 100. The second rear wheel 400 cannot be driven by the drive part 500 to rotate relative to the main body 100, failing to drive the main body 100 to move. The controller 600 is electrically connected to the drive part 500 to adjust a rotation speed of the drive part 500, so as to adjust a rotation speed of the first rear wheel 300.

The front wheel 200, the first rear wheel 300 and the second rear wheel 400 are independent of each other. In use, the drive part 500 rotates around its own axial direction to drive the first rear wheel 300 to rotate, so as to drive the main body 100 to move. When the main body 100 moves, the front wheel 200 and the second rear wheel 400 also rotate with the first rear wheel 300. The rotation speed of the drive part 500 can be adjusted via the controller 600 according to the actual requirement, so as to adjust the rotation speed of the first rear wheel 300 and further adjust a movement speed of the main body 100. Since only one drive part 500 is provided herein, and the drive part 500 is merely configured to drive the first rear wheel 300 to rotate, the scooter provided herein is actually a single-rear-wheel-drive scooter, which does not require a complicated differential used in the existing dual-rear-wheel-drive scooters, and is not prone to head-lifting compared to the existing single-front-wheel-drive scooters. Therefore, the scooter of the present disclosure has a simple structure, low cost and high safety.

In an embodiment, the first rear wheel 300 is a left rear wheel or a right rear wheel.

In an embodiment, the drive part 500 is a motor. Specifically, with the help of the controller 600, the stepless speed regulation of the motor is enabled, improving an applicability of the scooter.

In an embodiment, the controller 600 is configured to adjust the rotation speed and steering of the drive part 500, such that the rotation speed and steering of the first rear wheel 300 can be adjusted by the drive part 500. Specifically, the steering of the drive part 500 is adjusted by the controller 600, such that the drive part 500 drives the first rear wheel 300 to rotate clockwise or anticlockwise around the axial direction of the drive part 500 to control the scooter to move forward or backward.

As shown in FIG. 1, in an embodiment, the scooter further includes a connecting shaft 140, which is arranged on the main body 100. The drive part 500 is rotatably sleeved on the connecting shaft 140. The drive part 500 and the connecting shaft 140 are coaxially arranged. The drive part 500 is capable of rotating around an axial of the connecting shaft 140 to drive the first rear wheel 300 to rotate synchronously.

As shown in FIGS. 1 and 2, in an embodiment, the drive part 500 is arranged in the first rear wheel 300 and connected to an inner wall of the first rear wheel 300, such that the drive part 500 can drive the first rear wheel 300 to rotate synchronously when rotating around the axial direction of the connecting shaft 140. Specifically, the first rear wheel 300 is rotatably arranged with respect to the main body 100 via the drive part 500 and the connecting shaft 140.

In an embodiment, the drive part 500 includes a stator and a rotor rotatably connected with each other. The stator is fixedly sleeved on the connecting shaft 140. The rotor is connected to the inner wall of the first rear wheel 300. The rotor is capable of rotating with respect to the stator around the axial of the connecting shaft 140 to drive the first rear wheel 300 to rotate synchronously. Specifically, since the drive part 500 is arranged in the first rear wheel 300, the rotor is not connected to other wheels of the scooter, and the drive part 500 cannot drive other wheels to rotate.

As shown in FIG. 1, in an embodiment, the main body 100 includes a frame assembly 110 and a seat assembly 120. The seat assembly 120 is arranged on the frame assembly 110. The front wheel 200 is rotatably arranged at a front part of the frame assembly 110. The first rear wheel 300 and the second rear wheel 400 are spaced apart and rotatably arranged at a rear of the frame assembly 110. Specifically, a user can sit on the seat assembly 120 when using the scooter, which further improves the comfort. The connecting shaft 140 is arranged on the frame assembly 110.

In an embodiment, the seat assembly 120 is detachably arranged on the frame assembly 110. Specifically, the seat assembly 120 can be detached to reduce the space occupation when the scooter is not in use or needs to be transported.

In an embodiment, a height of the seat assembly 120 with respect to the frame assembly 110 is adjustable. Specifically, the height of the assembly 120 can be adjusted according to a height or usage habit of the user when using the scooter, which further improves the comfort.

As shown in FIG. 1, in an embodiment, the seat assembly 120 includes a seat 121 and a first adjustment assembly 122. The seat 121 is connected to the first adjustment assembly 122. The first adjustment assembly 122 is sleevedly connected to the frame assembly 110. The first adjustment assembly 122 is configured to adjust a height of the seat 121.

Figure 4:
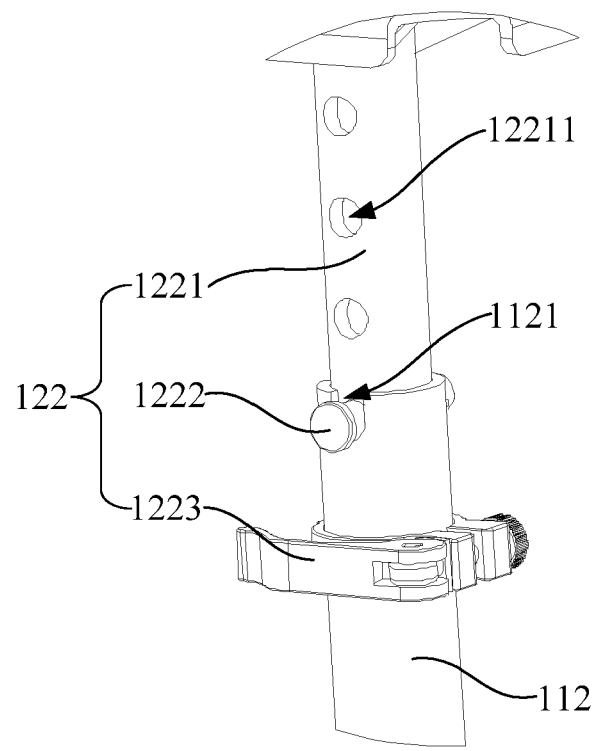
FIG. 4 schematically depicts connection between a first adjustment assembly and a second frame.

As shown in FIGS. 1 and 4, in an embodiment, the first adjustment assembly 122 includes a first adjustment rod 1221 and a second locking part 1222. One end of the first adjustment rod 1221 is sleevedly connected to the frame assembly 110, and the other end of the first adjustment rod 1221 is connected to the seat 121. The first adjustment rod 1221 is configured to be extended and retracted with respect to the frame assembly 110 along an axial direction of the first adjustment rod 1221, such that the height of the seat is adjustable along the axial direction of the first adjustment rod 1221. The second locking part 1222 is configured to lock the first adjustment rod 1221 to the frame assembly 110. Specifically, when the height of the seat 121 needs to be adjusted, the second locking part 1222 is operated to unlock the first adjustment rod 1221 and the frame assembly 110, such that the first adjustment rod 1221 can be extended or retracted along an axial direction of the first adjustment rod 1221, thereby the height of the seat 121 can be adjusted to a needed height. The second locking part 1222 is operated to lock the first adjustment rod 1221 and the frame assembly 110, such that the height of the seat 121 is adjusted and kept.

As shown in FIGS. 1 and 4, in an embodiment, an outer wall of the first adjustment rod 1221 is provided with adjustment holes 12211 with different heights. The frame assembly 110 is provided with a locking hole 1121. The second locking part 1222 is configured to successively pass through the locking hole 1121 and one of the adjustment holes 12211 in different height to adjust a length of the adjustment rod 1221 sleevedly connected with the frame assembly 110 and lock the adjustment rod 1221 to the frame assembly 110, such that the height of the seat 121 is adjusted and kept. In this embodiment, since the seat 121 is configured to carry a weight of the user, the second locking part 1222 successively passes through one of the locking hole 1121, so as to prevent the first adjustment rod 1221 from sliding with respect to the frame assembly 110 in an action of the weight of the user.

As shown in FIGS. 1 and 4, in an embodiment, the adjustment holes 12211 are spaced apart along the axial direction of the first adjustment rod 1221.

In an embodiment, a first adjustment assembly 122 is sleeved inside the frame assembly 110. Further, the first adjustment rod 1221 is sleeved inside the frame assembly 110, and a length of the first adjustment rod 1221 in the frame assembly 110 is adjustable, such that the first adjustment rod 1221 can be extended and retracted with respect to the frame assembly 110 along the axial direction of the first adjustment rod 1221. Specifically, the first adjustment rod 1221 is taken out from the frame assembly 110, such that the first adjustment rod 1221 can be detached with respect to the frame assembly 110. In other embodiments, the first adjustment assembly 122 is sleeved outside the frame assembly 110. Further, the first adjustment rod 1221 is sleeved outside the frame assembly 110, and a length of the first adjustment rod 1221 outside the frame assembly 110 is adjustable.

As shown in FIGS. 1 and 4, in an embodiment, the first adjustment assembly 122 further includes a first anti-off part 1223. The first anti-off part 1223 is arranged on the frame assembly 110 to prevent the first adjustment rod 1221 from being separated from the frame assembly 110. Specifically, the first anti-off part 1223 can be configured in a first state and a second state. The first adjustment rod 1221 cannot be detached from the frame assembly 110 when the first anti-off part 1223 is in the first state, preventing the first adjustment rod 1221 from being detached from the frame assembly 110 while adjusting the height of the seat 121 via the first adjustment rod 1221. The first adjustment rod 1221 can be detached from the frame assembly 110 when the first anti-off part 1223 in the second state.

Figure 5:
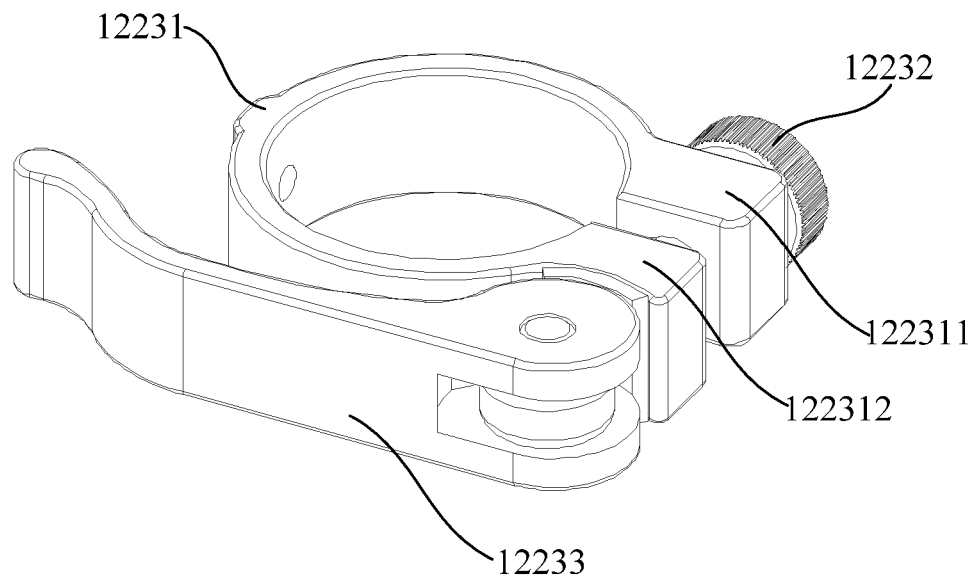
FIG. 5 schematically depicts a structure of a first anti-off part according to an embodiment of the present disclosure.

As shown in FIGS. 1, 4, and 5, in an embodiment, the first anti-off part 1223 includes a clamping part 12231 and a third locking part 12232. The clamping part 12231 and the third locking part 12231 are both elastic. The clamping part 12231 includes a first clamping portion 122311 and a second clamping portion 122312. The first clamping portion 122311 is connected to the second clamping portion 122312. The frame assembly 110 can be clamped and fixed between the first clamping portion 122311 and the second clamping portion 122312. The third locking part 12232 is configured to pass through the first clamping portion 122311 and the second clamping portion 122312 to adjust a distance between the first clamping portion 122311 and the second clamping portion 122312, thereby adjusting a clamping force of the first clamping portion 122311 and the second clamping portion 122312 applied to the frame assembly 110, such that the frame assembly 110 abuts against or releases the first adjustment rod 1221. Specifically, in use, the third locking part 12232 locks the first clamping portion 122311 and the second clamping portion 122312, such that the frame assembly 110 can be clamped by the first clamping portion 122311 and the second clamping portion 122312, and the frame assembly 110 abuts against the first adjustment rod 1121, so that the first adjustment rod 1121 sleeved in the frame assembly 110 cannot be completely detached from the frame assembly 110. When the seat assembly 120 needs to be detached, the third locking part 12232 is operated to unlock the first clamping portion 122311 and the second clamping portion 122312, such that the first clamping portion 122311 and the second clamping portion 122312 are away from each other to release the frame assembly 110. As a consequence, the first adjustment rod 1121 is released from the frame assembly 110 and can be completely detached from the frame assembly 110.

As shown in FIGS. 1, 4, and 5, in an embodiment, the first anti-off part 1223 further includes a rotating part 12233. The rotating part 12233 is rotatably connected to the third locking part 12232. The rotating part 12233 is configured to be rotated to drive the third locking part 12232 to move with respect to the clamping part 12231, driving the first clamping portion 122311 to move close to or away from the second clamping portion 122312. As a consequence, the frame assembly 110 is clamped by the clamping part 12231 or released, such that the frame assembly 110 presses against or releases the first adjustment rod 1221.

As shown in FIG. 1, in an embodiment, the seat 121 includes a seat base 1211 and a seat back 1212 connected with each other. An included angle is formed between the seat base 1211 and the seat back 1212. Specifically, the seat back 1212 can be adjusted such that a user can lean his back on the seat back 1212 when sitting on the seat base 1211, which further improves the comfort.

In an embodiment, the seat back 1212 is rotatably connected to the seat base 1211. The seat back 1212 can rotate with respect to the seat base 1211 to adjust the included angle therebetween, such that the seat 121 can be opened or folded. Specifically, the included angle between the seat base 1211 and the seat back 1212 can be adjusted to 0° to make the seat 121 folded when the scooter is not in use to reduce the space occupation.

As shown in FIG. 1, in an embodiment, the frame assembly 110 includes a first frame 111 and a second frame 112. The first frame 111 is rotatably connected to the second frame 112. The first frame 111 can rotate with respect to the second frame 112, so as to open or fold between the first frame 111 and the second frame 112. The front wheel 200 is rotatably arranged at a front part of the first frame 111. The first rear wheel 300 and the second rear wheel 400 are rotatably arranged and spaced apart at a rear of the second frame 112. The seat assembly 120 is arranged on the second frame 112. Specifically, the locking hole 1121 is arranged on the second frame 112. The connecting shaft 140 is arranged on the second frame 112.

As shown in FIG. 1, in an embodiment, the frame assembly 110 further includes a connecting part 113. The first frame 111 is rotatably connected to the second frame 112 through the connecting part 113.

Figure 6:
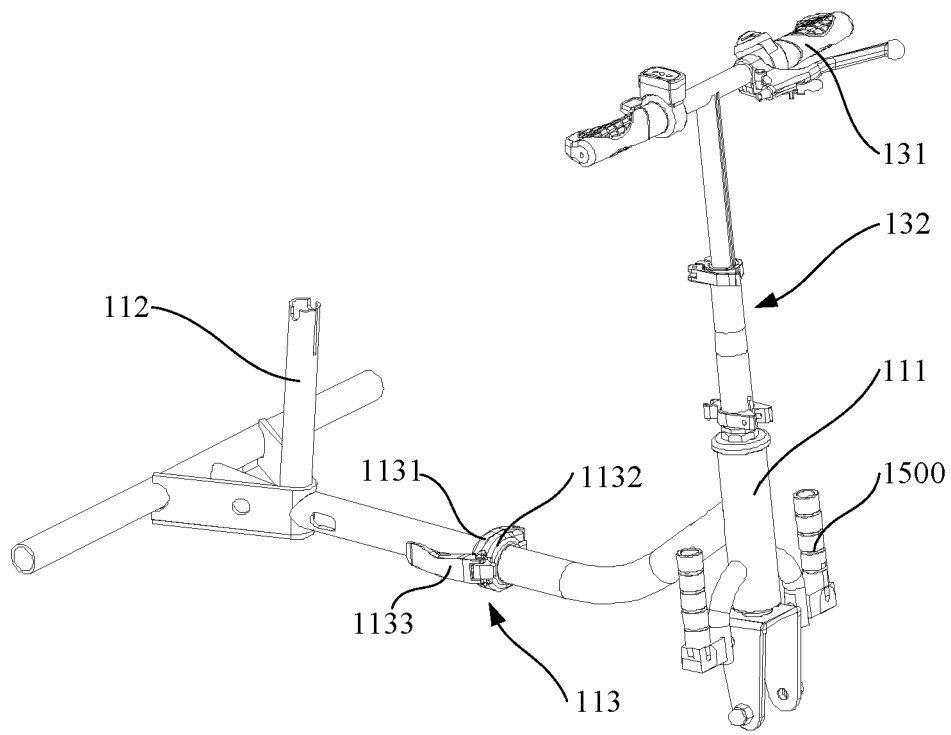
FIG. 6 schematically depicts a structure of a frame assembly.

As shown in FIGS. 1 and 6, in an embodiment, the connecting part 113 includes a first locking part 1133, a first connecting portion 1131 and a second connecting portion 1132. The first connecting portion 1131 is hinged to the second connecting portion 1132. The first connecting portion 1131 is arranged on the first frame 111. The second connecting portion 1132 is arranged on the second frame 112. The first frame 111 is rotatably connected to the second frame 112 through the first connecting portion 1131 and the second connecting portion 1132. The first locking part 1133 is configured to lock the first connecting portion 1131 and the second connecting portion 1132. Specifically, the first connecting portion 1131 and the second connecting portion 1132 are locked by the first locking part 1133 when the scooter is in use, so as to prevent the first frame 111 from a folding with respect to the second frame 112 which will affect an use of the scooter. When the scooter is not in use or needs to be transported, the first locking part 1133 is operated to unlock the first connecting portion 1131 and the second connecting portion 1132, and the first frame 111 is rotated toward a direction near to the second frame 112, thereby the first frame 111 is folded with respect to the second frame 112, so as to reduce the space occupation.

As shown in FIG. 1, in an embodiment, the main body 100 further includes a handle assembly 130. The handle assembly is rotatably arranged on the frame assembly 110. The front wheel 200 is rotatably arranged on the handle assembly 130. The front wheel 200 can be driven to rotate by rotating the handle assembly 130, so as to adjust an steering of the front wheel 200. Specifically, an user holds the handle assembly 130 when the scooter is in use. The steering of the front wheel 200 is adjusted by rotating the handle assembly 200, thereby a steering of the scooter is controlled.

In an embodiment, the handle assembly 130 is detachably arranged on the frame assembly 110. Specifically, the handle assembly 130 can be detached when the scooter is not in use or needs to be transported to reduce the space occupation.

In an embodiment, a height of the handle assembly 130 with respect to the frame assembly 110 is adjustable. Specifically, when the scooter is in use, the user can adjust the height of the handle assembly 130 according to their height or using habit to improve a comfort.

As shown in FIG. 1, in an embodiment, the handle assembly 130 includes a handle 131 and a second adjustment assembly 132. The handle 131 is connected to the second adjustment assembly 132. The second adjustment assembly 132 is configured to adjust a height of the handle 131. Further, the number of the handle 131 is two, which allows the user to hold with both hands.

Figure 7:
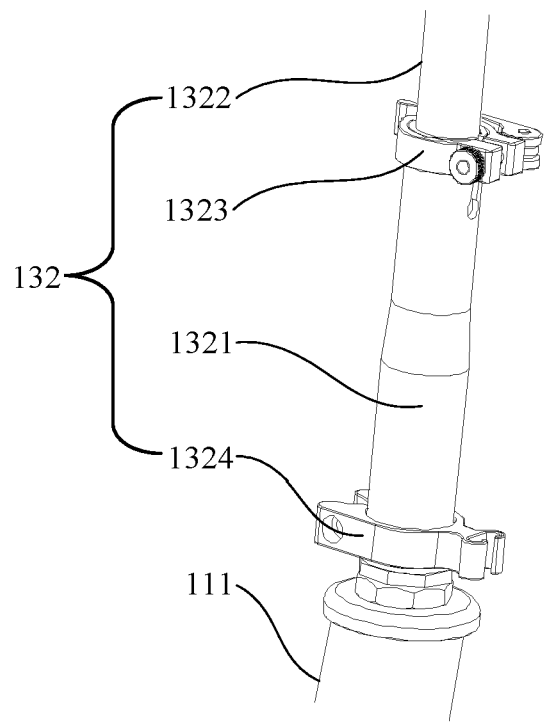
FIG. 7 schematically depicts connection between a second adjustment assembly and a first frame.

As shown in FIGS. 1 and 7, in an embodiment, the second adjustment assembly 132 includes a fixing rod 1321, a second adjustment rod 1322 and a fourth locking part 1323. The fixing rod 1321 is sleevedly connected to the second adjustment assembly 1322. The handle 131 is arranged on the second adjustment rod 1322. The fixing rod 1321 is rotatably arranged on the frame assembly 110. The second adjustment rod 1322 can be extended and retracted with respect to the fixing rod 1321 along an axial of the second adjustment rod 1322, such that the height of the handle 131 is adjustable along the axial direction of the second adjustment rod 1322. The fourth locking part 1323 is configured to lock the second adjustment rod 1322 to the fixing rod 1321. Specifically, when the height of the handle 131 needs to be adjusted, the fourth locking part 1323 is operated to unlock the second adjustment rod 1322 and the fixing rod

1321, such that the second adjustment rod 1322 can be can be extended or retracted along an axial direction of the second adjustment rod 1322, thereby the height of the handle assembly 110 can be adjusted to a needed height. The fourth locking part 1323 is operated to lock the second adjustment rod 1322 and the fixing rod 1321, such that the height of the handle 131 is kept.

In an embodiment, the second adjustment rod 1322 is sleeved in the fixing rod 1321. A length of the second adjustment rod 1322 inside the fixing rod 1321 is adjustable, such that the second adjustment rod 1322 can be extended and retracted with respect to the fixing rod 1321 along an axial of the second adjustment rod 1322. Specifically, the second adjustment rod 1322 is taken out form the fixing rod 1321, such that the second adjustment rod 1322 can be detached with respect to the fixing rod 1321. In other embodiment, the second adjustment 1322 is sleeved outside the fixing rod 1321, and a length of the second adjustment rod 1322 outside the fixing rod 1321 is adjustable.

As shown in FIGS. 1 and 7, in an embodiment, the second adjustment assembly 132 further includes a second anti-off part 1324. The second anti-off part 1324 is arranged on the fixing rod 1321 to prevent the second adjustment rod 1322 from being attached from the fixing rod 1321. Specifically, the second anti-off part 1324 can be configured in a first state and a second state. The second adjustment rod 1322 cannot be detached from the fixing rod 1321 when the second anti-off part 1324 in the first state, thereby preventing the second adjustment rod 1322 from being detached from the fixing rod 1321 while adjusting the height of the handle 131 via the second adjustment rod 1322. The second adjustment rod 1322 can be detached from the fixing rod 1321 when the second anti-off part 1324 in the second state.

In an embodiment, the structure of the second anti-off part 1324 is the same with that of the first anti-off part 1223.

Figure 8:
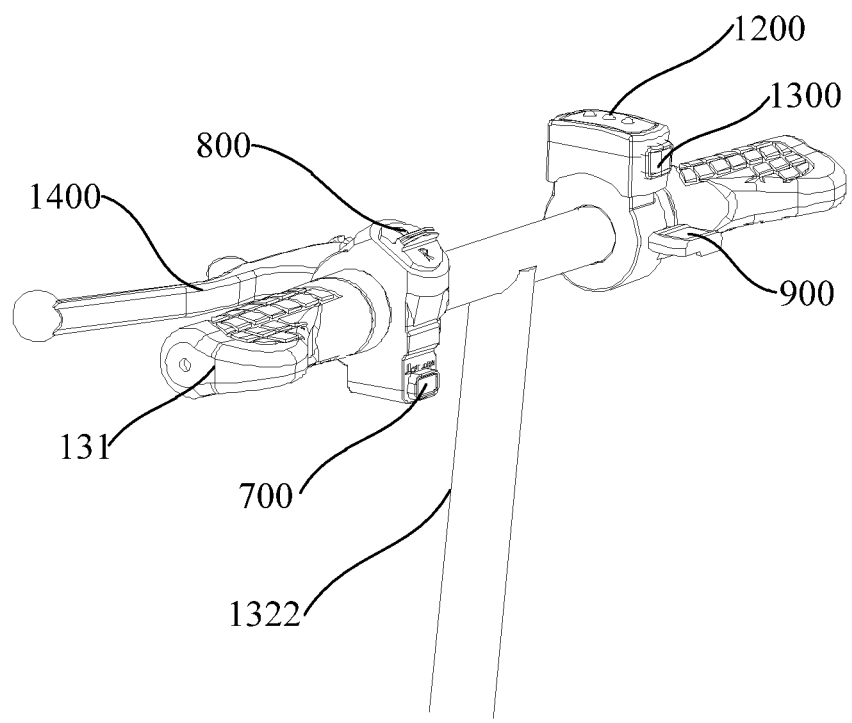
FIG. 8 schematically depicts a structure of a handle assembly.

As shown in FIGS. 1 and 8, in an embodiment, the scooter further includes a first control button 700. The first control button 700 is arranged on the handle assembly 130. The first control button 700 is electrically connected to the controller 600 to send a first control signal to the drive part 500, so as to control start and stop of the drive part 500 and further drive the first rear wheel 300 to rotate or stop. Specifically, the first control button 700 is arranged on the handle 131 or the second adjustment rod 1322.

As shown in FIGS. 1 and 8, in an embodiment, the scooter further includes a second control button 800. The second control button 800 is arranged on the handle assembly 130. The second control button 800 is electrically connected to the controller 600 to send a second control signal to the drive part 500, so as to control the steering of the drive part 500 to further adjust the steering of the first rear wheel 300. Specifically, the second control button 800 is arranged on the handle 131 or the second adjustment rod 1322.

In an embodiment, the second control button 800 is movably arranged on the handle assembly 130. The second control button 800 can be pushed to move with respect to the handle assembly 130, so that the second control button 800 is switched between a forward status and a backward status. The controller 600 controls the drive part 500 to drive the first rear wheel 300 to rotate clockwise around the axial direction of the drive part 500 when the second control button 800 is in the forward status, so as to control the scooter to move forward. The controller 600 controls the drive part 500 to drive the first rear wheel 300 to rotate anticlockwise around the axial direction of the drive part 500 when the second control button 800 is in the backward status, so as to control the scooter to move backward.

As shown in FIGS. 1 and 8, in an embodiment, the scooter further includes a third control button 900. The third control button 900 is arranged on the handle assembly 130. The third control button 900 is electrically connected to the controller 600 to send a third control signal to the drive part 500, so as to control the rotation speed of the drive part 500 to further adjust the rotation speed of the first rear wheel, adjusting the speed of the main body 100. Specifically, the third control button 900 is arranged on the handle 131 or the second adjustment rod 1322.

As shown in FIGS. 1 and 3, in an embodiment, the scooter further includes a power supply 1000, which is arranged on the main body 100. The power supply 1000 is electrically connected to the drive part 500 to supply power to the drive part 500.

As shown in FIGS. 1 and 3, in an embodiment, the scooter further includes a mounting shell 1100, which is arranged on the main body 100. The mounting shell 1100 is configured to accommodate the power supply 1000 to protect the power supply 1000. Specifically, the power supply 1000 is arranged on the second frame 112.

As shown in FIGS. 1 and 3, in an embodiment, the mounting shell 110 is further configured to accommodate the controller 600, so as to protect the power supply 1000 and the controller 600.

As shown in FIGS. 1 and 8, in an embodiment, the scooter further includes an indicator light 1200. The indicator light 1200 is arranged on the handle assembly 130. The indicator light 1200 is electrically connected to the power supply 1000 through the controller 600 to display the electric quantity of the power supply 1000. Specifically, the user can obtain the electric quantity of the power supply 1000 at any time, so that the user can decide whether to charge the scooter. Specifically, the indicator light 1200 is arranged on the handle 131 or the second adjustment rod 1322.

As shown in FIGS. 1 and 8, in an embodiment, the scooter further includes a fourth control button 1300. The fourth control button 1300 is arranged on the handle assembly 130. The fourth control button 1300 is electrically connected to the indicator light 1200 to control brightness of the indicator light 1200. Specifically, the fourth control button 1300 is arranged on the handle 131 or the second adjustment rod 1322.

In an embodiment, the fourth control button can automatically reset. The indicator light 1200 can be switched between light status and dark status by pressing the fourth control button 1300. Generally, the fourth control button 1300 can be pressed to make the indicator light 1200 in a dark status, so as to reduce the power consumption of the indicator light 1200. When the user needs to obtain the electric quantity of the power supply 1000, the fourth control button 1300 can be pressed to make the indicator light 1200 be in a light status, so as to obtain the electric quantity of the power supply 1000 through the indicator light 1200.

As shown in FIGS. 1 and 8, in an embodiment, the scooter further includes a handbrake 1400, which is arranged on the handle assembly 130. The handbrake 1400 is configured to lock the first rear wheel 300, so as to hinder the rotation of the first rear wheel 300. Specifically, a structure of the handbrake 1400 herein is the same with that of the handbrake in the prior art, which will not be described in detail herein.

As shown in FIGS. 1 and 6, in an embodiment, the scooter further includes a footrest portion 1500. The footrest portion 1500 is arranged on the main body 100. The footrest portion 1500 is configured for a user to step on. Specifically, the footrest portion 1500 is arranged on the first frame 111.

In an embodiment, the footrest portion 1500 is rotatably arranged on the main body 100. The footrest portion 1500 can rotate close to or away from the main body 100, such that the footrest portion 1500 can be opened or folded. Specifically, the footrest portion 1500 can be folded to reduce the space occupation when the scooter is not in use.

As shown in FIGS. 1 and 6, in an embodiment, two footrest portions 1500 are provided to allow both feet of the user to step on.

Mentioned above are merely preferred embodiments of this disclosure, and not intended to limit the scope of the present disclosure. Changes, modifications and replacements made by those killed in the art without departing from the spirit of this disclosure should fall within the scope of the present disclosure defined by the appended claims.

What is claimed is:

1. A scooter, comprising:
   a main body;
   a front wheel;
   a first rear wheel;
   a second rear wheel;
   a drive part; and
   a controller;
   wherein the front wheel is rotatably arranged at a front part of the main body; the first rear wheel and the second rear wheel are spaced apart and both rotatably arranged at a rear part of the main body; the drive part is connected to the first rear wheel; the number of the drive part is one; the drive part is configured to rotate around its own axial to drive the first rear wheel to rotate so as to drive the main body to move to further drive the front wheel and the second rear wheel to rotate; the second rear wheel is configured to be unable to be driven by the drive part to rotate with respect to the main body; and the controller is electrically connected to the drive part, and is configured to adjust a rotation speed of the drive part, so as to adjust a rotation speed of the first rear wheel; and the controller is also configured to adjust rotation direction of the drive part so as to adjust rotation direction of the first rear wheel;
   the main body comprises a frame assembly and a seat assembly; the frame assembly comprises a first frame and a second frame; the first frame is rotatably connected to the second frame; and a main body of each of the first frame and the second frame has a rod structure;
   the seat assembly is arranged on the frame assembly;
   the seat assembly comprises a seat and an adjustment assembly; the seat is connected to the adjustment assembly; the adjustment assembly is arranged on the frame assembly; and the adjustment assembly is configured to adjust a height of the seat;
   the adjustment assembly comprises an adjustment rod and a first locking part; one end of the adjustment rod is sleevedly connected to the frame assembly, and the other end of the adjustment rod is connected to the seat; the adjustment rod is configured to be extended and retracted with respect to the frame assembly along an axial direction of the adjustment rod, such that the height of the seat is adjustable along the axial direction of the adjustment rod; and the first locking part is configured to lock the adjustment rod to the frame assembly; and
   the adjustment assembly further comprises an anti-off part arranged on the second frame; the anti-off part is configured to prevent the adjustment rod from being separated from the second frame; the anti-off part comprises a clamping part and a second locking part; the clamping part and the second locking part are both elastic; the clamping part comprises a first clamping portion and a second clamping portion connected with each other; the first clamping portion and the second clamping portion are configured to clamp and fix the second frame; and the second locking part is configured to pass through the first clamping portion and the second clamping portion to adjust a distance between the first clamping portion and the second clamping portion, so as to allow the second frame to abut against or release the adjustment rod.

2. The scooter of claim 1, wherein the front wheel is rotatably arranged at a front part of the frame assembly; and the first rear wheel and the second rear wheel are spaced apart and rotatably arranged at a rear part of the frame assembly.

3. The scooter of claim 2, wherein the first frame is configured to rotate with respect to the second frame to realize opening or folding between the first frame and the second frame; the front wheel is rotatably arranged at a front part of the first frame; the first rear wheel and the second rear wheel are spaced apart and rotatably arranged at a rear part of the second frame; and the seat assembly is arranged on the second frame.

4. The scooter of claim 3, wherein the main body further comprises a handle assembly; the handle assembly is rotatably arranged on the frame assembly; and the front wheel is rotatably arranged on the handle assembly.

5. The scooter of claim 4, wherein the handle assembly is detachably arranged on the frame assembly; and/or
   a height of the handle assembly with respect to the frame assembly is adjustable.

6. The scooter of claim 4, further comprising:
   a handbrake;
   wherein the handbrake is arranged on the handle assembly; and the handbrake is configured to lock the first rear wheel, so as to hinder rotation of the first rear wheel.

7. The scooter of claim 4, further comprising:
   a power supply;
   an indicator light; and
   a control button;
   wherein the indicator light is arranged on the handle assembly, and is electrically connected to the power supply through the controller to display an electric capacity of the power supply; the control button is arranged on the handle assembly, and is electrically connected to the indicator light to control switching of the indicator light between a light status and a dark status.

8. The scooter of claim 1, wherein an outer side wall of the adjustment rod is provided with a plurality of adjustment holes with different heights; the frame assembly is provided with a locking hole; and the first locking part is configured to successively pass through the locking hole and one of the plurality of adjustment holes to adjust a length of the adjustment rod sleevedly connected with the frame assembly and lock the adjustment rod to the frame assembly, such that the height of the seat is adjusted and kept.

9. The scooter of claim 1, wherein the seat comprises a seat base and a seat back; the seat back is rotatably connected to the seat base; and the seat back is configured to rotate with respect to the seat base to allow the seat to be opened or folded.

10. The scooter of claim 1, further comprising:
    a connecting shaft arranged on the main body;

wherein the drive part is rotatably sleeved on the connecting shaft, and the drive part and the connecting shaft are coaxially arranged; the drive part is arranged in the first rear wheel, and is connected to an inner wall of the first rear wheel; and the drive part is configured to rotate around an axial direction of the connecting shaft to drive the first rear wheel to rotate synchronously.

* * * * *